United States Patent Office 3,199,601
Patented Aug. 10, 1965

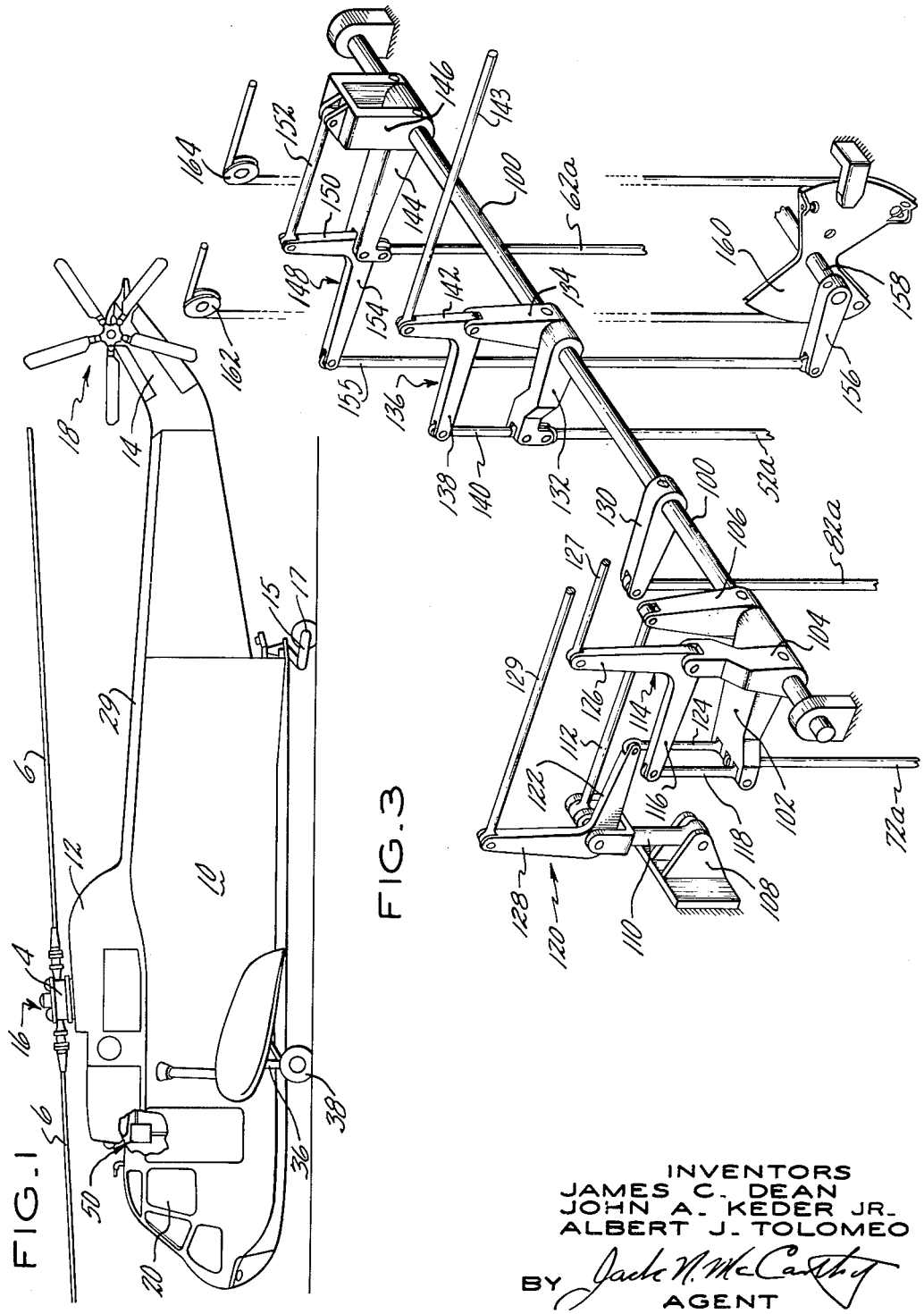

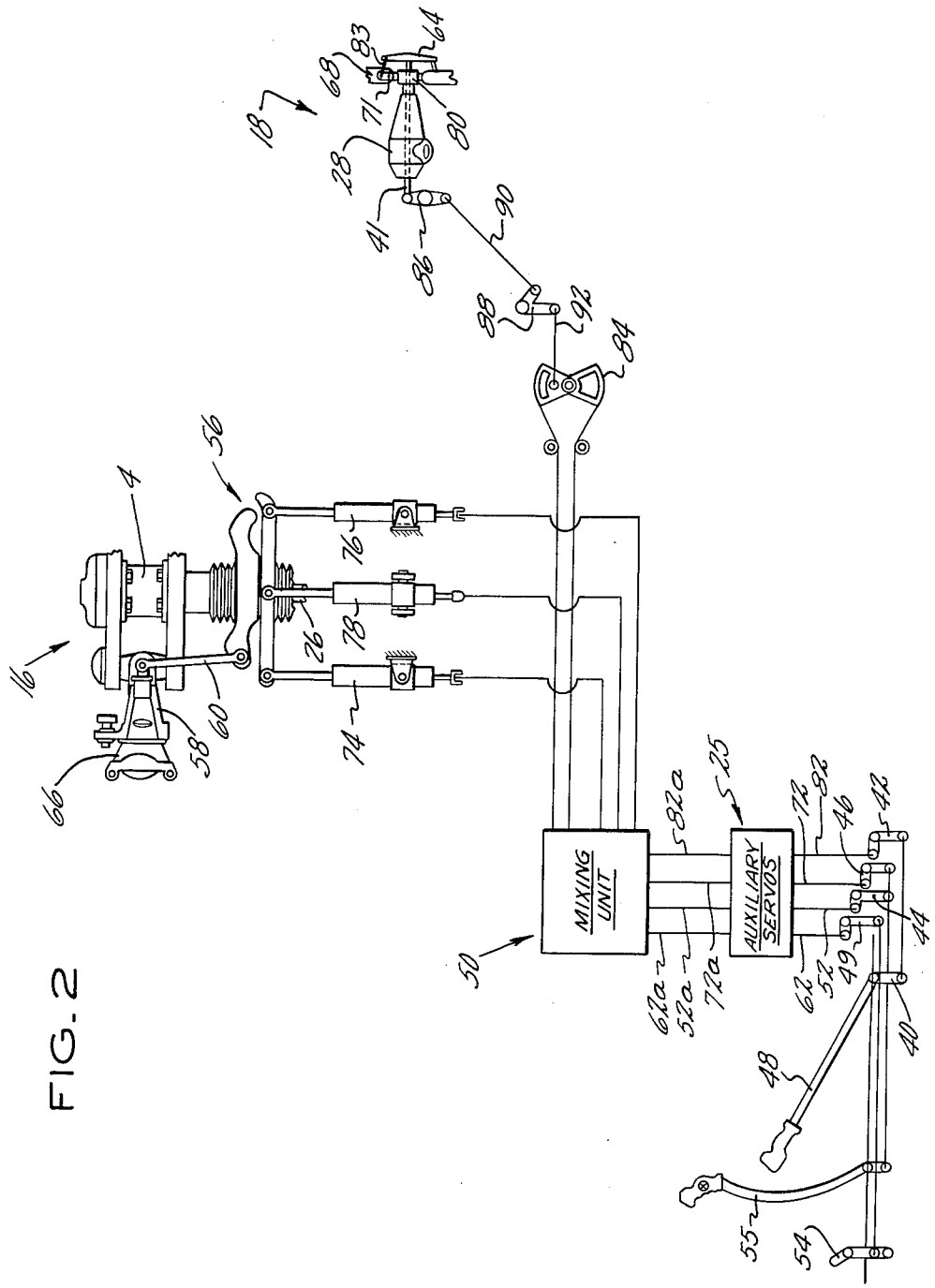

3,199,601
FLIGHT CONTROL SYSTEM
James C. Dean, Stratford, John A. Keder, Jr., Milford, and Albert J. Tolomeo, Stratford, Conn., assignors to United Aircraft Corporation, East Hartford, Conn., a corporation of Delaware
Filed Feb. 2, 1962, Ser. No. 171,331
14 Claims. (Cl. 170—135.22)

This invention relates to a flight control system for an aircraft, and particularly for helicopters.

An object of this invention is to provide a control system having a coupling between the collective pitch changing means and the directional control means to compensate for increase or decrease in torque when the collective pitch changing means is actuated.

Another object of this invention is to provide a control system having a coupling between the collective pitch changing means and the lateral cyclic pitch changing means to compensate for the tendency of aircraft to roll with increase or decrease of collective pitch.

A further object of this invention is to provide a control system having a coupling between the collective pitch changing means and the longitudinal, or fore and aft, cyclic pitch changing means to compensate for the tendency of aircraft to pitch with increase or decrease of collective pitch.

Another object of this invention is to provide a control system which will transmit signals at right angles while performing a mixing function.

A further object of this invention is to provide a control system which will perform desired mixing functions while being constructed in a manner which will cost the least weight penalty to the aircraft.

Another object of this invention is to provide a control system which will provide increased performance and handling qualities without necessitating additional pilot control.

Another object of this invention is to provide a control system which will reduce operational requirements for integrated automatic stabilization equipment.

These and other objects and advantages of the invention will be pointed out in connection with the following detailed description of the drawings in which one embodiment is illustrated.

In the drawings:

FIG. 1 is a side elevational view of a helicopter with a portion broken away to show the location of the mixing unit;

FIG. 2 is a schematic diagram of the control system; and

FIG. 3 is an enlarged view of the mixing unit.

Referring to FIG. 1, the helicopter embodying the invention comprises essentially an elongated fuselage 10 having a main rotor pylon 12 and a tail rotor pylon 14 on which are mounted the main rotor generally indicated at 16 and a tail rotor generally indicated at 18. The main rotor 16 comprises a rotor head 4 having rotor blades 6 mounted thereon for pitch changing movement. Rotor head 4 is rotated by a rotor shaft 26.

In the helicopter structure shown, two jet engines are mounted side by side in a housing on the fuselage in front of the main rotor pylon 12. These two engines provide the power-plant section having an output drive from therebetween. This drive in turn drives rotor shaft 26 and the tail rotor drive shaft. A tail rotor drive shaft housing 29 covers this shaft. The helicopter is supported on the ground by landing gear including main struts 36 and wheels 38 and a tail strut 15 and wheel 17.

The control system shown in FIG. 2 comprises four main parts. These parts are (1) the pilot's controls and devices which directly transmit movements of the controls, (2) a main rotor system, (3) a tail rotor system and (4) a mixing unit for combining the movement of the pilot's controls to achieve the desired actuation of the main rotor system and the tail rotor system.

The operator's compartment 20 houses an operator's seat and controls for the operator. These controls comprise normal helicopter controls such as a collective pitch stick 48, a cyclic pitch stick 55 and tail rotor foot control pedals 54. Actuation of the collective pitch stick 48 in turn moves a downwardly extending arm 40. The free end of the arm 40 is connected to the free end of a downwardly extending arm of a bell crank lever 42 by a link. The free end of the horizontally extending arm of the bell crank lever 42 is connected to an auxiliary servo by a control rod 82. The output of the servo actuates a control rod 82a.

Actuation of the cyclic pitch stick 55 in a fore and aft direction in turn moves the free end of a downwardly extending arm of a bell crank lever 44. The free end of the horizontally extending arm of the bell crank lever 44 is connected to an auxiliary servo by a control rod 52. The output of the servo actuates a control rod 52a. Actuation of the cyclic pitch stick 55 in a lateral direction in turn moves the free end of a downwardly extending arm of a bell crank lever 46. The free end of the horizontally extending arm of the bell crank lever 46 is connected to an auxiliary servo by a control rod 72. The output of the servo actuates a control rod 72a.

Actuation of the tail rotor foot control pedals 54 in turn moves the free end of a downwardly extending arm of a bell crank lever 49. The free end of the horizontally extending arm of the bell crank lever 49 is connected to an auxiliary servo by a control rod 62. The output of the servo actuates a control rod 62a. Controls of this type are shown in more detail in U.S. Patent No. 2,957,648 to G. J. Howard, Jr., et al. for Crane Helicopter and Its Controls.

The main rotor system, in addition to the rotor head 4 and the rotor blades 6 mounted thereon for pitch changing movement, includes a swashplate assembly 56 having an upper rotatable swashplate member and a lower stationary swashplate member. The upper rotatable swashplate member is connected to the blade pitch changing horn 58 of each blade by a link 60. A blade pitch changing horn 58 extends from the blade attaching sleeve 66 of each blade 6. A rotor head and associated swashplate assembly of this type is shown in more detail in U.S. Patent No. 2,774,553 to H. T. Jensen for Damper By-Pass for Lag-Lead Control of Helicopter Rotor Blades. A primary servo 74 is pivotally mounted to helicopter structure with its output rod connected to the stationary swashplate member at a point which will move the swashplate assembly in a proper manner to achieve lateral control. A primary servo 76 is located at a point 180° from the primary servo 74 and is pivotally mounted to helicopter structure with its output rod connected to the stationary swashplate member at a point which will move the swashplate assembly in the same direction as the primary servo 74. A primary servo 78 is pivotally mounted to helicopter structure with its output rod connected to the stationary swashplate member at a point which will move the swashplate assembly in a proper manner to achieve longitudinal control.

The tail rotor system, in addition to the tail rotor 18 which comprises a tail rotor head 80 having a tail rotor blades 68 mounted thereon for pitch changing movement, includes a tail rotor transmission housing 28 fixed to aircraft structure. A reciprocable tubular rod 41 extends through the tail rotor transmission housing and has a pitch changing beam 64 located at its end extending transversely of the rod. Each of the blades 68 has a blade pitch changing horn 71. Each pitch changing horn is connected to the pitch changing beam by a link 83 so that reciprocation of tubular rod 41 will provide collective pitch change of the tail rotor blades 68.

A quadrant 84 is pivotally mounted to the aircraft adjacent its tail. Movements of the quadrant are transmitted to the tubular rod 41 to reciprocate it through a mechanical linkage. This mechanical linkage includes a bell crank lever 86 having its upper end attached to the free end of tubular rod 41. The lower end of the bell crank lever 86 is connected to the free end of a second bell crank lever 88 by a link 90. The other end of bell crank lever 88 is connected to a point on the quadrant 84 by a link 92.

A tail rotor of this type is shown in more detail in U.S. Patent No. 2,795,284 to I. I. Sikorsky for a tail rotor counterweight.

The mixing unit, as shown in FIG. 3, includes a shaft 100 mounted for rotation within the helicopter and in a position transverse to the longitudinal axis thereof. Each of the control rods 72a, 82a, 52a and 62a extending upwardly from the auxiliary servos is connected to the shaft 100.

In the position shown in FIG. 3, which is a position having the cyclic control neutral and collective control in mid-pitch, the upper end of the rod 72a is pivotally attached to the center of a forwardly projecting arm 102 which is pivotally mounted on shaft 100. An upwardly extending arm 104 is fixed to the shaft 100 adjacent its left side and an upwardly extending arm 106 of approximately the same length as arm 104 is fixed to the shaft 100 adjacent its right side. A bracket 108 is fixed to helicopter structure at approximately the same level as the arm 102 and extends toward said arm. A link 110 extends upwardly from said bracket 108 and has its lower end pivotally attached thereto. The link 110 is shorter than arms 104 and 106. This difference in length provides a lateral cyclic input when the collective pitch stick 48 is moved. This link 110 or levers 104 and 106 can be adjustable to vary the coupling ratio between collective pitch movement and lateral cyclic pitch movement. The upper end of link 110 is formed having three tines. A link 112 extends between the free end of arm 106 and the right side of the upper end of link 110. This link is pivotally attached at each end. A bell crank lever 114 is pivotally mounted to the top of arm 104. The horizontally extending lever 116 of this bell crank lever is approximately equal in length to arm 102 and has its free end attached to the left side of the free end of arm 102 by a link 118. Arm 104 is offset to provide proper alignment in this linkage. This link is also pivotally attached at each end.

A bell crank lever 120 is pivotally mounted to the left side of the upper end of link 110. The horizontally extending lever 122 of this bell crank lever is approximately equal in length to the horizontally extending lever 116 of bell crank lever 114. The free end of lever 122 is attached to the right side of the free end of arm 102 by a link 124. This link is also pivotally attached at each end.

Each of the bell cranks 114 and 120 have upwardly extending levers 126 and 128, respectively, of approximately the same length. The upper free end of lever 126 is connected to the input of the primary servo 76 by a rod 127 and the upper free end of the lever 128 is connected to the input of the primary servo 74 by a rod 129.

The upper end of the rod 82a is pivotally attached to the free end of a forwardly projecting arm 130 which is fixed to the shaft 100. The upper end of the rod 52a is pivotally attached to the free end of a forwardly projecting arm 132 which is pivotally mounted on shaft 100. An upwardly extending shaft 134 is fixed to the shaft 100 adjacent the right side of arm 132 where it rotates about shaft 100. A bell crank lever 136 is pivotally mounted to the top of arm 134. The horizontally extending lever 138 is approximately equal in length to the arm 132 and has its free end attached to the free end of arm 132 by a link 140 which is approximately equal in length to the arm 134. This link is also pivotally attached at each end. Arm 132 is offset to provide proper alignment in this linkage. Bell crank 136 has an upwardly extending arm 142 which has its upper end connected to the input of the fore and aft primary servo 78 by a rod 143.

Arm 134 and link 140 are shorter in length than arm 130 to provide a fore and aft cyclic input when the collective pitch stick 48 is moved. This arm and link can be adjustable to vary the coupling ratio between collective pitch movement and fore and aft cyclic pitch movement.

The upper end of the rod 62a is pivotally attached between downwardly extending tines of a bifurcated portion of the free end of a forwardly projecting arm 144 which is pivotally mounted on shaft 100. A U-shaped arm 146 extends upwardly from shaft 100 with each free end of the U being fixedly mounted to the shaft 100 adjacent each side of the arm 144, respectively. A bell crank lever 148 is pivotally mounted to the free end of the arm 144 between the tines thereof and above the pivotal attachment of the upper end of rod 62a. Bell crank lever 148 has an upwardly extending arm 150 which is approximately equal in length to the U-shaped arm 146. The free end of the U-shaped arm 146 is attached by a link 152 to the free end of the arm 150. This link is also pivotally attached at each end and is approximately equal in length to arm 144.

The bell crank lever 148 has a horizontally extending lever 154 which has its free end attached by a rod 155 to the free end of a horizontally extending lever 156 which is fixed to a shaft 158 which is rotatably mounted in the helicopter. Also fixed to the shaft 158 is a quadrant 160 which has each end connected by a cable to the corresponding ends of the quadrant 84. The cables extend upwardly from the quadrant 160 and extend over rollers 162 and 164 to leave the rollers in a horizontal direction.

Arm 154 is provided to insert a directional control input when the collective pitch stick 48 is moved. This arm can be made adjustable to provide for varying the coupling ratio between collective pitch movement and tail rotor pitch movement.

It is to be understood that the invention is not limited to the specific embodiment herein illustrated and described, but may be used in other ways without departure from its spirit as defined by the following claims.

We claim:

1. In combination in a helicopter; a rotor head; blades mounted on said head for pitch changing movement; first means for collectively changing the pitch of said blades; second means for cyclically changing the pitch of said blades to provide lateral movement of said helicopter; third means for cyclically changing the pitch of said blades to provide longitudinal movement of said helicopter; a tail rotor; said tail rotor having tail rotor blades mounted for pitch changing movement; fourth means for collectively changing the pitch of said tail rotor blades; and means connecting said first means for collectively changing the pitch of said blades with said second means for cyclically changing the pitch of said blades, said third means for cyclically changing the pitch of said blades, and said fourth means for collectively changing the pitch of said tail rotor blades; said last named means including a mixing device which actuates said second means for cyclically changing the pitch of said blades, said third means for cyclically changing the pitch of said blades, and said fourth means for collectively changing the pitch of said tail rotor blades when said first means for collectively changing the pitch of said blades is actuated.

2. In combination in a helicopter; a rotor head; blades mounted on said head for pitch changing movement; first means for collectively changing the pitch of said blades; second means for cyclically changing the pitch of said blades to provide lateral movement of said helicopter; third means for cyclically changing the pitch of said blades to provide longitudinal movement of said helicopter; a tail rotor; said tail rotor having tail rotor blades mounted for pitch changing movement; fourth means for collectively changing the pitch of said tail rotor blades; and means connecting said first means for collectively changing the pitch of said blades with said second means for cyclically changing the pitch of said blades, said third means for cyclically changing the pitch of said blades, and said fourth means for collectively changing the pitch of said tail rotor blades; said last named means including a mixing device which actuates said second means for cyclically changing the pitch of said blades, said third means for cyclically changing the pitch of said blades, and said fourth means for collectively changing the pitch of said tail rotor blades a predetermined amount when said first means for collectively changing the pitch of said blades is actuated.

3. In combination in a helicopter; a rotor head; blades mounted on said head for pitch changing movement; first means for collectively changing the pitch of said blades; second means for cyclically changing the pitch of said blades to provide lateral movement of said helicopter; third means for cyclically changing the pitch of said blades to provide longitudinal movement of said helicopter; a tail rotor; said tail rotor having tail rotor blades mounted for pitch changing movement; fourth means for collectively changing the pitch of said tail rotor blades; and means connecting said first means for collectively changing the pitch of said blades with said second means for cyclically changing the pitch of said blades, said third means for cyclically changing the pitch of said blades, and said fourth means for collectively changing the pitch of said tail rotor blades; said last named means including a mixing device which actuates said second means for cyclically changing the pitch of said blades, said third means for cyclically changing the pitch of said blades, and said fourth means for collectively changing the pitch of said tail rotor blades a predetermined amount when said first means for collectively changing the pitch of said blades is actuated, means for varying said predetermined amount for given movement of said first means.

4. In combination in a helicopter; a rotor head; blades mounted on said head for pitch changing movement; first means for cyclically changing the pitch of said blades to provide lateral movement of said helicopter; second means for cyclically changing the pitch of said blades to provide longitudinal movement of said helicopter; a tail rotor; said tail rotor having tail rotor blades mounted for pitch changing movement; third means for collectively changing the pitch of said tail rotor blades; and fourth means for actuating said first means for cyclically changing the pitch of said blades, said second means for cyclically changing the pitch of said blades, and said third means for collectively changing the pitch of said tail rotor blades to provide a collective pitch change.

5. In combination in a helicopter; a rotor head; blades mounted on said head for pitch changing movement; first means for cyclically changing the pitch of said blades to provide lateral movement of said helicopter; second means for cyclically changing the pitch of said blades to provide longitudinal movement of said helicopter; a tail rotor; said tail rotor having tail rotor blades mounted for pitch changing movement; third means for collectively changing the pitch of said tail rotor blades; fourth means for actuating said first means for cyclically changing the pitch of said blades, said second means for cyclically changing the pitch of said blades, and said third means for collectively changing the pitch of said tail rotor blades; said last named fourth means providing a collective pitch change with a predetermined lateral and longitudinal cyclic pitch change incorporated.

6. In combination in a helicopter; a rotor head; blades mounted on said head for pitch changing movement; first means for cyclically changing the pitch of said blades to provide lateral movement of said helicopter; second means for cyclically changing the pitch of said blades to provide longitudinal movement of said helicopter; a tail rotor; said tail rotor having tail rotor blades mounted for pitch changing movement; third means for collectively changing the pitch of said tail rotor blades; fourth means for actuating said first means for cyclically changing the pitch of said blades, said second means for cyclically changing the pitch of said blades, and said third means for collectively changing the pitch of said tail rotor blades; said last named fourth means providing a collective pitch change with a predetermined lateral and longitudinal cyclic pitch change incorporated, said last named fourth means incorporating a predetermined collective tail pitch change.

7. A mixing linkage having four inputs and four outputs, a first input having a first and second output which are equal but opposite in direction, a second input having a third output, a third input having a fourth output, a fourth input actuating each of said first and second outputs and said third output without affecting the first input and second input, said fourth input also actuating said fourth output, said first input, second input and third input bing capable of having their respective outputs operated simultaneously with movement thereof by said fourth input.

8. A mixing linkage having four inputs and four outputs; a first input having a first and second output which are equal but opposite in direction; a second input having a third output; a third input having a fourth output; a fourth input actuating each of said first and second outputs and said third output without affecting the first input and second input; said fourth input also actuating said fourth output; said first input, second input and third input being capable of having their respective outputs operated simultaneously with movement thereof by said fourth input; means for varying the output of said third and fourth output with a given fourth input.

9. A mixing linkage having four input rods and three output rods and one cable output means; a first input rod having a first and second output rods which are moved equally but opposite in direction; a second input rod having a third output rod; a third input rod having a fourth cable output means; a fourth input rod actuating each of said first and second output rods and said third output rod without affecting the first input rod and second input rod; said fourth input also actuating said fourth cable output; said first input rod, second input rod and third input rod being capable of having their respective output rods and cable output means operated simultaneously with movement thereof by said fourth input.

10. A mixing linkage having four input rods and three output rods and one cable output means; a first input rod having a first and second output rods which are moved equally but opposite in direction; a second input rod having a third output rod; a third input rod having a fourth cable output means; a fourth input rod actuating each of said first and second output rods and said third output rod without affecting the first input rod and second input rod; said fourth input also actuating said fourth cable output; said first input rod, second input rod and third input rod being capable of having their respective output rods and cable output means operated simultaneously with movements thereof by said fourth input; said four input rods extend in approximately the same direction and said three output rods and said cable output means extending in a direction approximately 90° from said input direction.

11. A mixing linkage having a housing, a rod supported in said housing for rotation, a first lever fixed at one end to said rod and extending outwardly from said rod, a second lever pivotally mounted at one end to said rod and extending therefrom at an angle of approximately 90° to said first lever, a first bell crank having two arms with an angle of approximately 90° therebetween and pivotally mounted where its arms meet to the free end of the first lever, one arm of said first bell crank extends parallel to said second lever and the other arm extends upwardly, a first link connecting the free end of said second lever and the free end of said arm parallel thereto, a first input actuating member connected to the free end of said second lever and a first output member extending from the free end of the upwardly extending arm of the first bell crank, a third lever fixed at one end to said rod and extending therefrom, a second input actuating member connected to the free end of said third lever, a fourth lever fixed at one end to said rod and extending outwardly from said rod, a fifth lever pivotally mounted at one end to said rod and extending therefrom at an angle of approximately 90° to said fourth lever, a second bell crank having two arms with an angle of approximately 90° therebetween and pivotally mounted where its arms meet to the free end of said fourth lever, one arm of said second bell crank extends parallel to said fifth lever and the other arm extends upwardly, a second link connecting the free end of said fifth lever and the free end of said arm parallel thereto, a third input actuating member connected to the free end of said fifth lever and a second output member extending from the free end of the upwardly extending arm of the second bell crank, a sixth lever fixed at one end to said rod and extending outwardly from said rod, a seventh lever pivotally mounted at one end to said rod and extending therefrom at an angle of approximately 90° to said first lever, a third bell crank having two arms at an angle of approximately 90° therebetween and pivotally mounted where its arms meet to the free end of said seventh lever, one arm of said third bell crank extends parallel to said sixth lever while the other arm extends approximately 90° thereto, a third link connecting the free end of said sixth lever to the free end of said arm parallel thereto, a fourth input actuating member connected to the free end of said seventh lever, and a third output member extending from the free end of the other arm of the third bell crank.

12. In combination in a helicopter, a rotor head, blades mounted on said head for pitch changing movement, first means for collectively changing the pitch of said blades, second means for cyclically changing the pitch of said blades for lateral movement of the helicopter, third means for cyclically changing the pitch of said blades for longitudinal movement of the helicopter, fourth means for providing directional control, and means connecting said first means for collectively changing the pitch of said blades with said second means and third means for cyclically changing the pitch of said blades and said fourth means for providing directional control, said last-named means including a mixing device which actuates said second and third means for cyclically changing the pitch of said blades and said fourth means for providing directional control when said first means for collectively changing the pitch of said blades is actuated.

13. In combination in a helicopter, a rotor head, blades mounted on said head for pitch changing movement, first means for collectively changing the pitch of said blades, second means for cyclically changing the pitch of said blades for lateral movement of the helicopter, third means for cyclically changing the pitch of said blades for longitudinal movement of the helicopter, fourth means for providing directional control, and means connecting said first means for collectively changing the pitch of said blades with said second and third means for cyclically changing the pitch of said blades and said fourth means for providing directional control, said last-named means including a mixing device which actuates said second and third means for cyclically changing the pitch of said blades a predetermined amount and said fourth means for providing a predetermined directional control when said first means for collectively changing the pitch of said blades is actuated.

14. In combination in a helicopter: a rotor head; blades mounted on said head for pitch changing movement; first means for cyclically changing the pitch of said blades to provide lateral control of said helicopter; second means for cyclically changing the pitch of said blades to provide longitudinal control of said helicopter; third means for providing directional control; and fourth means for actuating said first means for cyclically changing the pitch of said blades providing lateral control of said helicopter, said second means for cyclically changing the pitch of said blades providing longitudinal control of said helicopter, and said third means providing directional control to provide a collective pitch change.

References Cited by the Examiner
UNITED STATES PATENTS

| 2,473,299 | 6/49 | Pitcairn | 170—135.22 |
| 2,599,690 | 6/52 | Buivid et al. | 170—160.25 |
| 2,698,059 | 12/54 | Pullin | 170—135.22 |
| 2,811,212 | 10/57 | Sikorsky | 170—135.22 |
| 2,877,856 | 3/59 | Campbell | 170—160.25 |
| 3,109,496 | 11/63 | Ellis et al. | 170—160.25 |

JULIUS E. WEST, *Primary Examiner.*

MILTON BUCHLER, *Examiner.*